US011342003B1

(12) United States Patent
Siagian et al.

(10) Patent No.: US 11,342,003 B1
(45) Date of Patent: May 24, 2022

(54) SEGMENTING AND CLASSIFYING VIDEO CONTENT USING SOUNDS

(71) Applicant: Amazon Technologies, Inc., Seattle, WA (US)

(72) Inventors: Christian Garcia Siagian, Los Angeles, CA (US); Christian Ciabattoni, Los Angeles, CA (US); David Niu, Los Angeles, CA (US); Lawrence Kyuil Chang, Los Angeles, CA (US); Gordon Zheng, North Hollywood, CA (US); Ritesh Pase, Seattle, WA (US); Shiva Krishnamurthy, Sammamish, WA (US); Ramakanth Mudumba, Lake Forest, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/711,797

(22) Filed: Dec. 12, 2019

(51) Int. Cl.
*G11B 27/30* (2006.01)
*G10L 25/57* (2013.01)
*G10L 15/08* (2006.01)
*G10L 15/26* (2006.01)
*G06V 20/40* (2022.01)
*G06V 40/16* (2022.01)

(52) U.S. Cl.
CPC .......... *G11B 27/309* (2013.01); *G06V 20/41* (2022.01); *G06V 40/172* (2022.01); *G10L 15/08* (2013.01); *G10L 15/26* (2013.01); *G10L 25/57* (2013.01); *G11B 27/3081* (2013.01)

(58) Field of Classification Search
CPC .............. G11B 27/309; G11B 27/3081; G06K 9/00288; G06K 9/00718; G10L 15/08; G10L 15/26; G10L 25/57
See application file for complete search history.

(56) References Cited

U.S. PATENT DOCUMENTS

| | | | |
|---|---|---|---|
| 9,633,270 B1 * | 4/2017 | Tangeland | G10L 17/00 |
| 10,455,257 B1 | 10/2019 | Propst et al. | |
| 10,607,598 B1 | 3/2020 | Larson et al. | |
| 2003/0182118 A1 * | 9/2003 | Obrador | G06F 16/7834 704/246 |
| 2008/0018783 A1 | 1/2008 | Chen et al. | |

(Continued)

OTHER PUBLICATIONS

U.S. Appl. No. 16/711,841, entitled "Segmenting and Classifying Video Content Using Conversation" filed Dec. 12, 2019.

(Continued)

*Primary Examiner* — Mishawn N. Hunter
(74) *Attorney, Agent, or Firm* — Thomas | Horstemeyer, LLP

(57) ABSTRACT

Disclosed are various embodiments for segmenting and classifying video content using sounds. In one embodiment, a plurality of segments of a video content item are generated by analyzing audio accompanying the video content item. A subset of the plurality of segments that correspond to music segments is selected based at least in part on an audio characteristic of the subset of the plurality of segments. Individual segments of the subset of the plurality of segments are processed to determine whether a classification applies to the individual segments. A list of segments of the video content item to which the classification applies is generated.

20 Claims, 8 Drawing Sheets

(56) References Cited

U.S. PATENT DOCUMENTS

| | | | |
|---|---|---|---|
| 2009/0079871 A1* | 3/2009 | Hua | H04N 21/4347 |
| | | | 348/584 |
| 2017/0017645 A1 | 1/2017 | Neumeier et al. | |
| 2017/0094357 A1* | 3/2017 | Park | H04N 21/6582 |
| 2019/0007780 A1 | 1/2019 | Sheaffer et al. | |

OTHER PUBLICATIONS

U.S. Appl. No. 16/711,841, filed Dec. 12, 2019, Non-Final Office Action dated Oct. 6, 2020.

* cited by examiner

SEGMENTING AND CLASSIFYING VIDEO CONTENT USING SOUNDS

BACKGROUND

Video content such as movies and television programs are generally composed of a number of scenes. Viewers may be interested in watching some scenes and not others. For example, viewers may play a movie and fast-forward until they see a specific scene they remember or are interested in. It may be frustrating for a viewer to search for a scene of interest, especially when the viewer cannot recall a time within the video content that the scene occurs.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to segmenting video content, such as movies, television programs, and the like, and then classifying the segments. Video content may include a number of scenes, and users may be interested in watching one or more of the scenes and not others. For example, viewers may be interested in watching scenes that contain memorable quotations or songs, or scenes that depict particular themes such as inspirational, comedic, or sad scenes. Also, viewers may wish to watch scenes that depict a particular character story arc, such as that of a love story. A user who would like to watch a particular scene may have to scroll or fast-forward through an entire video content item to find it. Even still, some users may not know or remember how the scene visually appears, which can make identifying the particular scene impossible without watching the entire video content item up until the particular scene.

One approach may be to have agents manually classify scenes within a video content item. This can be an extremely slow and labor-intensive process. This would not be scalable and could not process a video content item faster than real-time. Further, manual classification can introduce errors, either through misclassification or through missed classifications.

Various embodiments of the present disclosure introduce approaches for automatically segmenting a video content item using its accompanying audio. These segments may correspond to scenes, chapters, or other segments of the video content. The segments can then be processed using machine learning models based on visual understanding and language and/or visual understanding and sound, in conjunction with available metadata such as plot synopses, cast member lists, cast member reference images, and so forth. The processing of segments may occur in parallel, such that a video content item is processed faster than real-time. The processing may assign zero or more classifications to the segment. As a consequence, playlists of segments having particular classifications can be generated, so that a user may be able to play all comedic scenes in a movie, all action sequences in the movie, all love story scenes in the movie, all scenes with memorable quotations in the movie, all scenes that feature music in the movie, and so forth.

Figure 1:
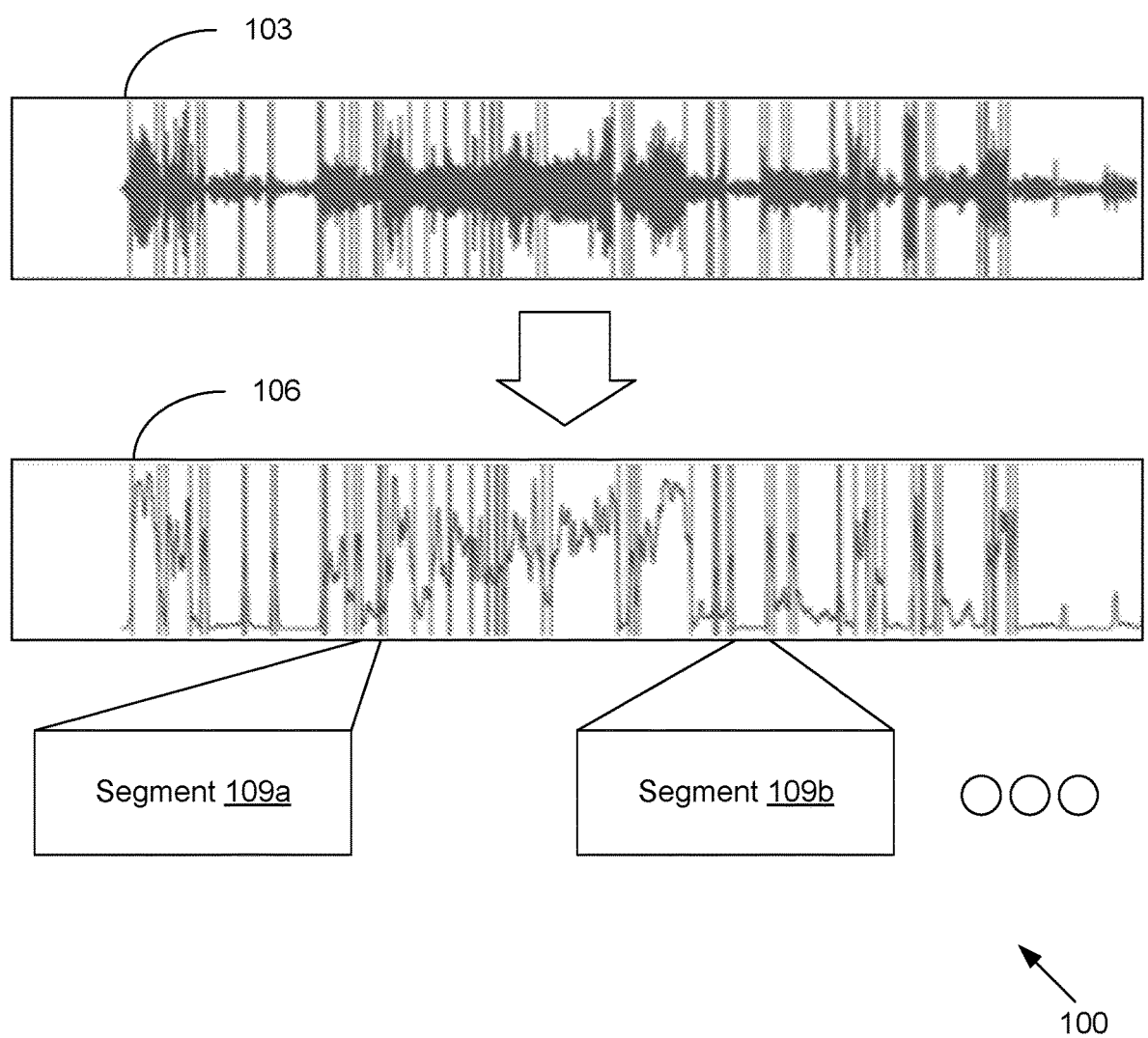
FIG. 1 is a drawing of an example scenario involving processing of a video content item according to various embodiments of the present disclosure.

Turning now to FIG. 1, shown is an example scenario 100 of processing a video content item according to various embodiments. As will be described further, an audio track accompanying the video content item is used to segment the video content item. The waveform 103 represents the raw audio in the time domain. The waveform 103 is first divided into small, atomic audio segments, which are then classified as being silent segments or sound segments based on their relative amplitude within the audio track.

The output of these classifications is shown as the signal 106. The signal 106 may be smoothed based on a larger time window, and segments 109 can be determined. For example, the segments 109a and 109b may correspond to portions of the signal 106 that are relatively quiet, which may correspond to conversation scenes. By contrast, portions of the signal 106 that are relatively loud may correspond to music or sound scenes. The identified segments 109 may then be processed to determine whether a classification based on visual understanding and/or dialogue analysis is applicable. In the following discussion, a general description of the system and its components is provided, followed by a discussion of the operation of the same.

Figure 2:
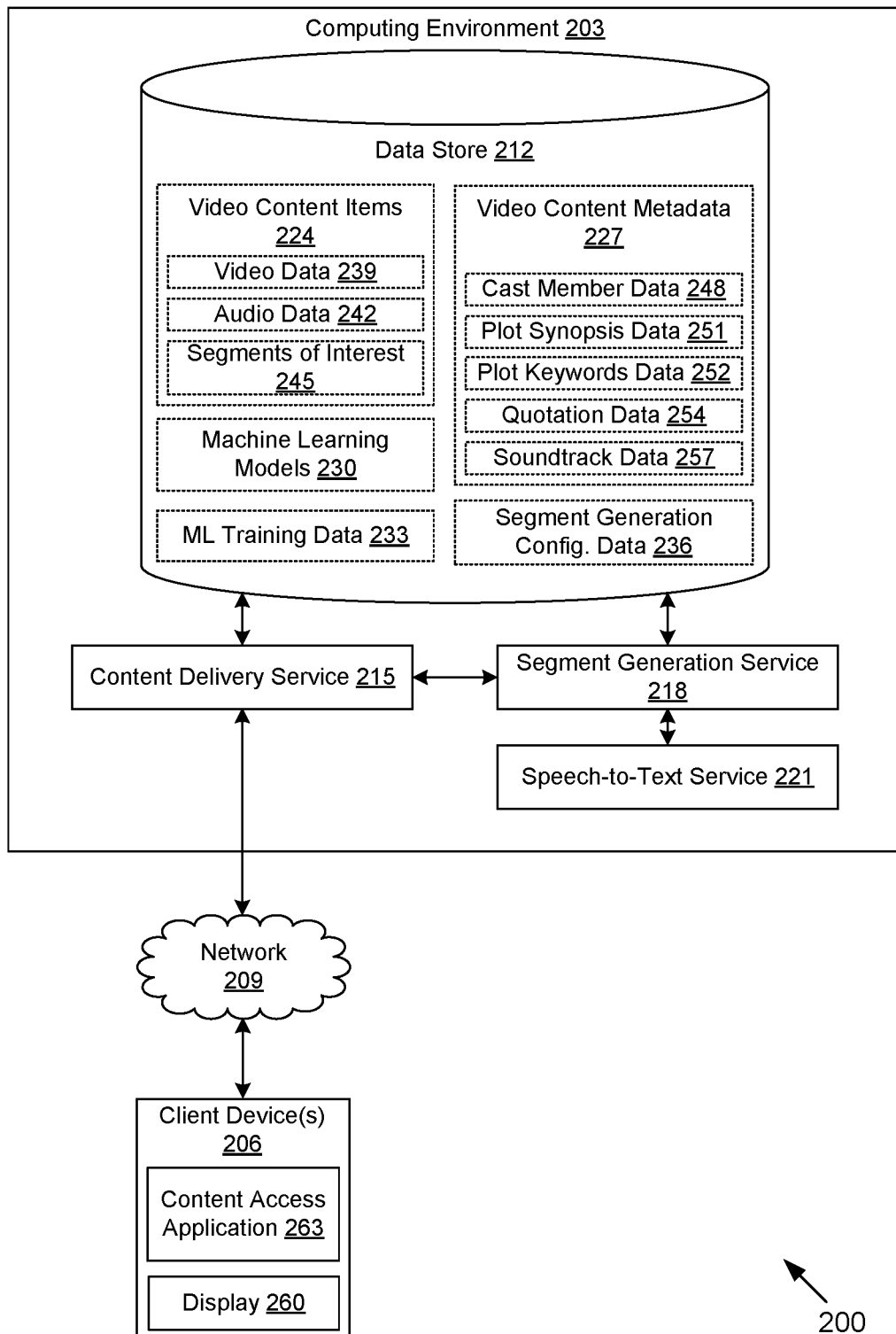
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery services 215, a segment generation service 218, a speech-to-text service 221, and other applications, services, processes, systems, engines, or functionality not discussed in detail herein. The content delivery service 215 is executed to serve up or stream video content to client devices 206. The content delivery service 215 may support a resume functionality such that playback of video content may be stopped at a point in the video content on one device and later resumed at that point on the same device or a different device.

The segment generation service 218 is executed to generate segments from video content via audio analysis. The segment generation service 218 may combine the audio analysis with visual understanding and dialogue analysis in order to determine classifications of segments. In segmenting the video content, the segment generation service 218 may allow for processing of the segments with parallelism. Through distributed implementation and scaling of components of the segment generation service 218, the segment generation service 218 may be capable of processing and classifying video content in faster than real-time. The speech-to-text service 221 may be executed to receive audio corresponding to speech and to generate text representing the speech.

The data stored in the data store 212 includes, for example, video content items 224, video content metadata 227, one or more machine learning models 230, machine learning training data 233, segment generation configuration data 236, and potentially other data. The video content items 224 may correspond to video content such as movies, television programs, and/or other forms of video content. The video content items 224 may be prerecorded in some scenarios. The video content items 224 may include video data 239, audio data 242, segments of interest 245, and/or other data.

The video data 239 includes a plurality of video frames corresponding to the video portion of the video content item 224. For example, the video data 239 may include 24 frames per second, 60 frames per second, or some other frame rate. The audio data 242 may correspond to an accompanying audio track for the video content item 224. The audio data 242 may be a primary audio track or a secondary audio track, e.g., for a secondary language. The audio data 242 may be sampled at 32 kHz, 16 kHz, or some other sample rate and may have 16 bit or another quantization. The video data 239 and the audio data 242 may be timecoded so as to be played back in synchronization with each other.

The segments of interest 245 correspond to specific segments of the video content item 224 that are particularly identified as having a classification of interest. Each of the segments of interest 245 may have a start time and an end time automatically determined by the segment generation service 218. The segments of interest 245 for a particular classification may be aggregated into a playlist containing multiple segments. Non-limiting examples of segments of interest 245 may correspond to segments containing inspirational quotations, songs, action sequences, thematic elements, character story arcs, love story arcs, and so on.

The video content metadata 227 corresponds to extrinsic metadata associated with video content items 224. The video content metadata 227 may be generated through automated analysis or may be manually curated. As will be described the video content metadata 227 may be used in conjunction with analysis of the audio data 242 for identifying segments of interest 245. The video content metadata 227 may include cast member data 248, plot synopsis data 251, plot keywords data 252, quotation data 254, soundtrack data 257, and/or other data. In some embodiments, the video content metadata 227 may exclude time-coded event data.

The cast member data 248 includes data about cast members who appear or otherwise perform in the video content items 224. For example, the cast member data 248 may include names of cast members and the characters they play. The cast member data 248 may include reference images of the cast members and/or the characters as they appear in the video content items 224. The reference images may include facial and/or body images of the cast member/character.

The plot synopsis data 251 includes a synopsis or summary of the video content item 224. In some cases, the synopsis may be manually drafted by a reviewer who has watched the video content item 224. The synopsis may be crowd sourced from multiple reviewers. As will be described, the plot synopsis data 251 may be a rich source of information for machine learning for identifying character relationships, thematic elements, and potential story arcs.

The plot keywords data 252 may include tags or other keywords that have been applied to the video content item 224. For example, a movie containing a love story may be tagged with the keywords "love," "romance," and/or "romantic." The plot keywords data 252 may be manually curated by editors and/or crowdsourced from multiple viewers in various embodiments.

The quotation data 254 may include significant quotations from cast members or characters in the video content items 224. The quotations may be editorially curated similarly to the plot synopsis data 251 and/or may be crowd sourced. For example, the quotation data 254 may include inspirational quotations, funny quotations, widely known quotations, and so forth. The quotation data 254 may include an association of a character/cast member with a specific portion of dialogue. In some cases, the quotation data 254 may include a paraphrase of the actual dialogue from the video content item 224.

The soundtrack data 257 may describe a soundtrack of the video content items 224, including an identification of instrumental music and songs. The soundtrack data 257 may include song lyrics as well as an identification of a cast member/character that performs the song.

The machine learning models 230 correspond to models that are trained to process identified segments to determine which should be given a classification as a type of segment of interest 245. The machine learning models 230 may be trained using the machine learning training data 233 to recognize thematic elements to characterize scenes. For example, the machine learning models 230 may recognize comedic scenes, inspirational scenes, action scenes, calm scenes, and/or other types of scenes. The machine learning models 230 may take the video data 239, the audio data 242, transcribed speech or dialogue, plot synopses, and/or other data as input in order to make the classification. In one scenario, a machine learning model 230 may be trained to process plot synopsis data 251 and identify sets of characters that are involved in a love story or other character story arc.

The segment generation configuration data 236 includes settings and thresholds used to control the operation of the segment generation service 218. Some of these parameters may be empirically determined to work well and/or provide an acceptable processing complexity/accuracy tradeoff.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 260. The display 260 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

Each client device 206 may be configured to execute various applications such as a content access application 263 and/or other applications. The content access application 263 is executed to obtain video content items 224 from the content delivery service 215 and to render the video content items 224 on the display 260. In some cases, the video content item 224 may be rendered on a different display 260 (of the same or different client device 206) from the user interface. In one embodiment, the content access application 263 may be a plug-in of a browser or otherwise executed in the environment of the browser. The client devices 206 may be configured to execute other applications such as, for example, mobile applications, email applications, social networking applications, etc.

Figure 3:
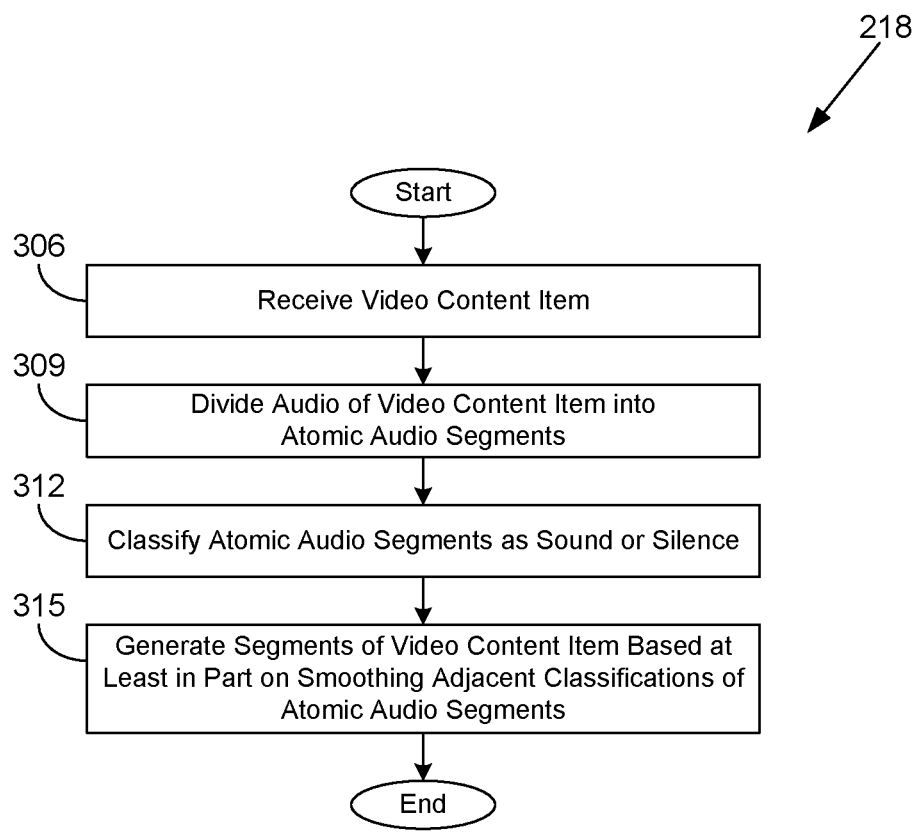
FIGS. 3-7 are flowcharts illustrating examples of functionality implemented as portions of a segment generation service executed in a computing environment in the networked environment of FIG. 2 according to various embodiments of the present disclosure.

Referring next to FIG. 3, shown is a flowchart that provides one example of the operation of a portion of the segment generation service 218 according to various embodiments. It is understood that the flowchart of FIG. 3 provides merely an example of the many different types of functional arrangements that may be employed to implement the operation of the portion of the segment generation service 218 as described herein. As an alternative, the flowchart of FIG. 3 may be viewed as depicting an example of elements of a method implemented in the computing environment 203 (FIG. 2) according to one or more embodiments.

Beginning with box 306, the segment generation service 218 receives a video content item 224 (FIG. 2). For example, the video content item 224 may be previously stored in the data store 212 (FIG. 2) or elsewhere on a content delivery network. The segment generation service 218 may need to receive the entirety of the video content item 224 in order to compute statistics and thresholds that pertain to the video content item 224. Alternatively, the segment generation service 218 may be capable of processing a portion of the video content item 224 at a time.

Prior to receiving the video content item 224, one or more machine learning models 230 (FIG. 2) may be trained to classify segments of interest 245 (FIG. 2) based on video content metadata 227 (FIG. 2) such as plot synopsis data 251 (FIG. 2) or dialogue data. For example, a machine learning model 230 may be a deep Bidirectional Encoder Representations from Transformers (BERT) model used for language understanding. Such a machine learning model 230 may be trained to recognize dialogue associated with comedic scenes, inspirational scenes, action scenes, love scenes, and/or other thematic scenes. In this regard, the machine learning training data 233 (FIG. 2) that is used may include a quantity of dialogue that is manually classified as not including a type of thematic element, and a quantity of dialogue that is manually classified as including the type of thematic element.

In box 309, the segment generation service 218 divides the audio data 242 (FIG. 2) accompanying the video content item 224 into a plurality of atomic audio segments of a fixed length. In one implementation, an atomic audio segment is 20 milliseconds in length, or 320 samples using a 16 kHz sample rate. Other segment lengths and sample rates may be used in other implementations (e.g., 100 millisecond segment length). The audio data 242 may be available both in the time domain (i.e., samples corresponding to amplitude) and in the frequency domain (i.e., a vector representing frequency content). In one embodiment, a mel-frequency cepstrum analysis may be performed on the atomic feature vector to determine mel-frequency cepstrum coefficients (MFCCs). The time-domain and frequency-domain signals may be combined into a single feature vector for the atomic audio segment for processing.

In box 312, the segment generation service 218 classifies the individual atomic audio segments, for example, as being a sound/music segment or a silent segment. Although the term "silent" is used, it is understood as a relative term. For example, conversations may be relatively quiet because the director does not want viewers to be distracted from the dialogue by other noises or music. In one implementation, the highest ten percent of amplitudes are classified as a sound/music segment, while the lowest ten percent of amplitudes are classified as a silent segment. Different relative thresholds based on a relative amplitude distribution for the atomic audio segments may be used in other implementations. In various embodiments, a support-vector machine (SVM) may be employed to perform the classification. The classification may also be based on frequency-domain information, such as MFCCs, in the feature vector of the atomic audio segment. For example, conversation segments may have a much narrower frequency content than music segments.

In box 315, the segment generation service 218 generates segments of the video content item 224 based at least in part on smoothing adjacent classifications of atomic audio segments using a time window. For example, the adjacent classifications may be smoothed or averaged across a one to ten second time window. This can account for conversations that include yelling, or music that has quiet portions. The classifications may be clustered or aggregated to obtain segments of the video content item 224 that may correspond to scenes of the video content items 224. A typical two-hour movie may have 20-60 segments that are in the range of minutes in length.

In various embodiments, the segment generation service 218 may perform two or more tiers of classification. For example, the segment generation service 218 may perform a classification on the atomic audio segments and then smooth that classification. Subsequently, the segment generation service 218 may perform a clustering at a longer length (e.g., 10 seconds) and perform another classification based on the longer length clusters of smoothed atomic audio segments. Thereafter, the operation of the portion of the segment generation service 218 ends.

Figure 4:
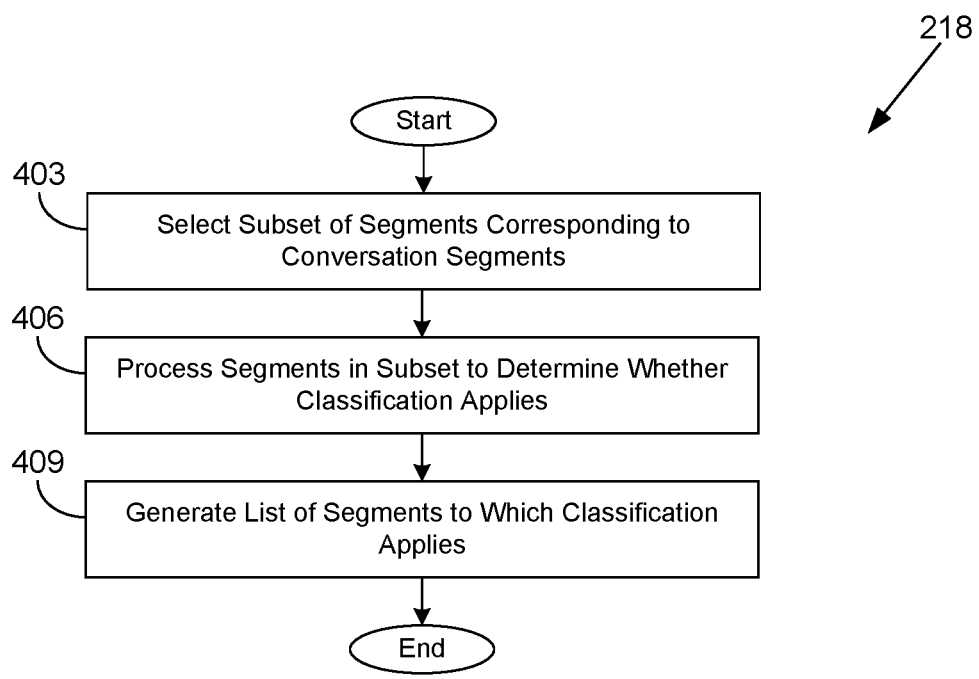

Moving on to FIG. 4, shown is a flowchart that provides one example of the operation of another portion of the segment generation service 218 according to various embodiments. It is understood that the flowchart of FIG. 4 provides merely an example of the many different types of functional arrangements that may be employed to implement the operation of the portion of the segment generation service 218 as described herein. As an alternative, the flowchart of FIG. 4 may be viewed as depicting an example of elements of a method implemented in the computing environment 203 (FIG. 2) according to one or more embodiments.

Beginning with box 403, the segment generation service 218 selects a subset of the segments identified in FIG. 3 that correspond to conversation segments based at least in part on an audio characteristic. In selecting the subset, the segment generation service 218 can perform processing to identify which segments correspond to conversation segments. In one implementation, the segment generation service 218 may begin with segments that are relatively silent. The segment generation service 218 can then perform face detection on the corresponding video frames of the silent segments to count the number of relatively silent frames with faces. If that number divided by the total number of silent frames in the segment is above a threshold, such as 25 percent, the segment may be classified as a conversation segment.

In box 406, the segment generation service 218 processes the segments in the subset to determine whether one or more classifications apply to the segment. For example, the segment generation service 218 may obtain dialogue corresponding to the segment through the use of a speech-to-text service 221 (FIG. 2) or from corresponding closed captioning or subtitle data and then apply a machine learning model 230 (FIG. 2) that is trained to recognize thematic elements. Also, the segment generation service 218 may perform a visual analysis based upon the detection of certain characters via face and/or body detection to confirm whether a certain classification applies.

In box 409, the segment generation service 218 generates a list of segments to which the classification applies. For example, the segment generation service 218 may generate a playlist so that a content access application 263 (FIG. 2) executed on a client device 206 (FIG. 2) may stream segments of interest 245 (FIG. 2) in chronological order in the video content item 224 (FIG. 2), while skipping segments that do not meet the classification. For example, a viewer may view a playlist of all comedic scenes, all sad scenes, all love scenes, etc., within a video content item 224. Thereafter, the operation of the portion of the segment generation service 218 ends.

Figure 5:
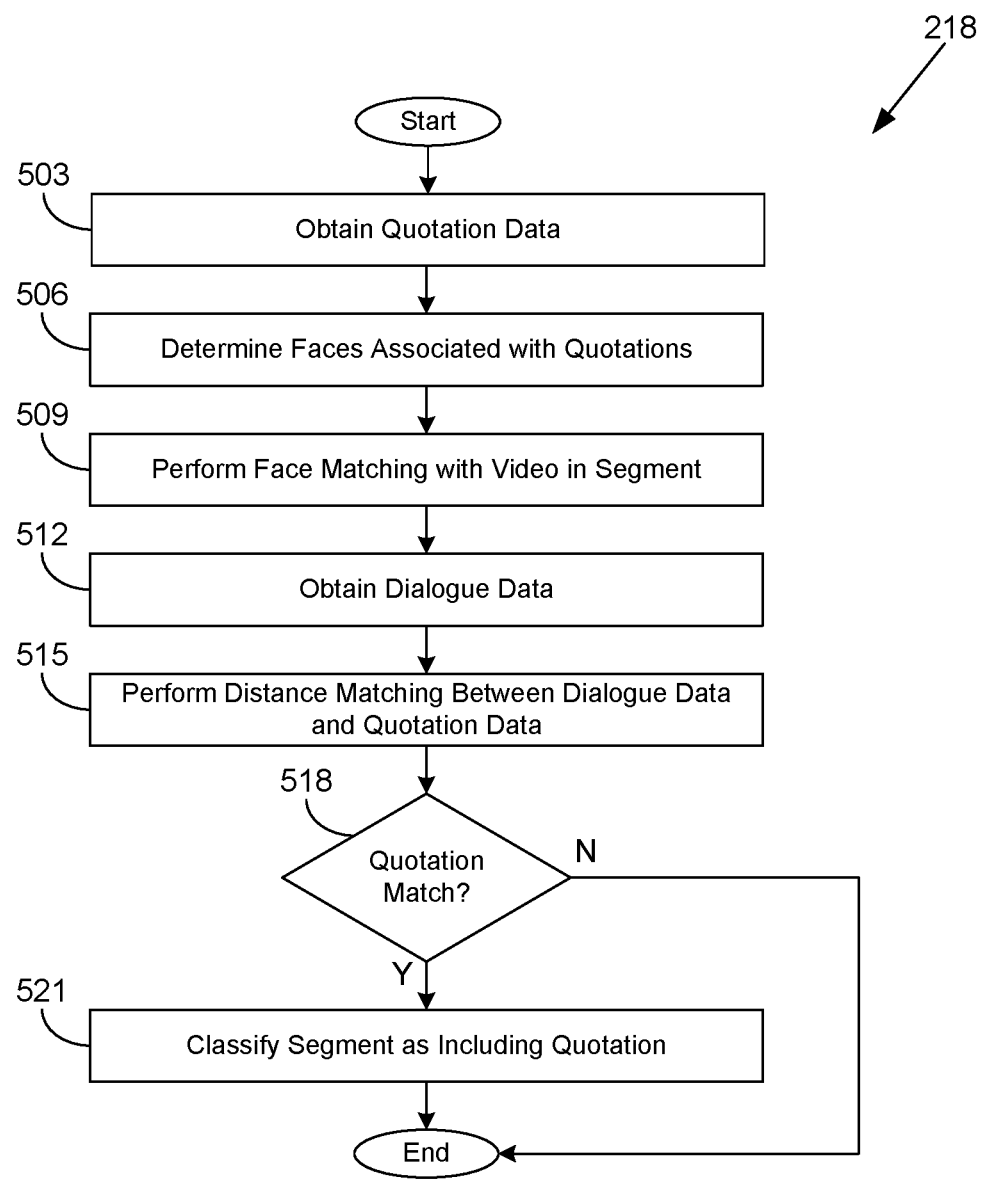

Continuing to FIG. 5, shown is a flowchart that provides one example of the operation of another portion of the segment generation service 218 according to various embodiments. Specifically, FIG. 5 relates to processing a segment to identify a quotation. It is understood that the flowchart of FIG. 5 provides merely an example of the many different types of functional arrangements that may be employed to implement the operation of the portion of the segment generation service 218 as described herein. As an alternative, the flowchart of FIG. 5 may be viewed as depicting an example of elements of a method implemented in the computing environment 203 (FIG. 2) according to one or more embodiments.

Beginning with box 503, the segment generation service 218 obtains quotation data 254 (FIG. 2) for a video content item 224 (FIG. 2). In box 506, the segment generation service 218 determines faces and/or bodies that are associated with quotations in the quotation data 254. For example, the segment generation service 218 may obtain reference images of cast members from the cast member data 248 (FIG. 2) for cast members corresponding to characters who are quoted.

In box 509, the segment generation service 218 may perform face matching with the video data 239 (FIG. 2) corresponding to the segment. In this regard, Mean-Shift Clustering may be used to obtain the appropriate face feature center points in the video frames. Each center point is a form of face profile on the respective character. For example, 128-dimensional DLIB face recognition may be used with a corresponding Euclidean distance lower than 0.6 being considered to be a match.

In box 512, the segment generation service 218 obtains dialogue data for the segment. For example, the segment generation service 218 may obtain the dialogue data from a speech-to-text service 221 (FIG. 2) based on the audio data 242 (FIG. 2) of the segment. Alternatively, the segment generation service 218 may obtain the dialogue data from closed captioning data, subtitle data, or another source.

In box 515, the segment generation service 218 may perform a distance matching between the dialogue data of the segment and the quotation data 254. In this regard, a text-on-text Levenshtein distance, or edit distance, matching may be performed to find a most likely correspondence.

Although the flowchart of FIG. 5 shows the face matching being performed before the dialogue distance matching, it is understood that both may be performed in parallel, or the dialogue distance matching may be performed before the face matching. In some scenarios, the dialogue distance matching may be performed faster or with fewer processing resources than the face matching.

In box 518, the segment generation service 218 determines whether the segment matches a quotation in the quotation data 254 based at least in part on the text distance matching and the face recognition. In one implementation, if the minimal edit distance between the dialogue and the quotation is above a threshold of 33 percent of the number of characters in the compared quotation, the segment generation service 218 determines no match. Otherwise, if the minimal edit distance is under 33 percent, the segment generation service 218 notes the corresponding faces using the face features (or body features). If the face match is above an example threshold of 0.6 (i.e., the dialogue was spoken by the correct character for the quotation), the segment is considered to match the quotation.

If the segment matches a quotation, the segment generation service 218 continues to box 521 and classifies the segment as including the quotation. For example, the segment may be added to a playlist of segments of interest 245 for quotations. Thereafter, the operation of the portion of the segment generation service 218 ends.

Figure 6:
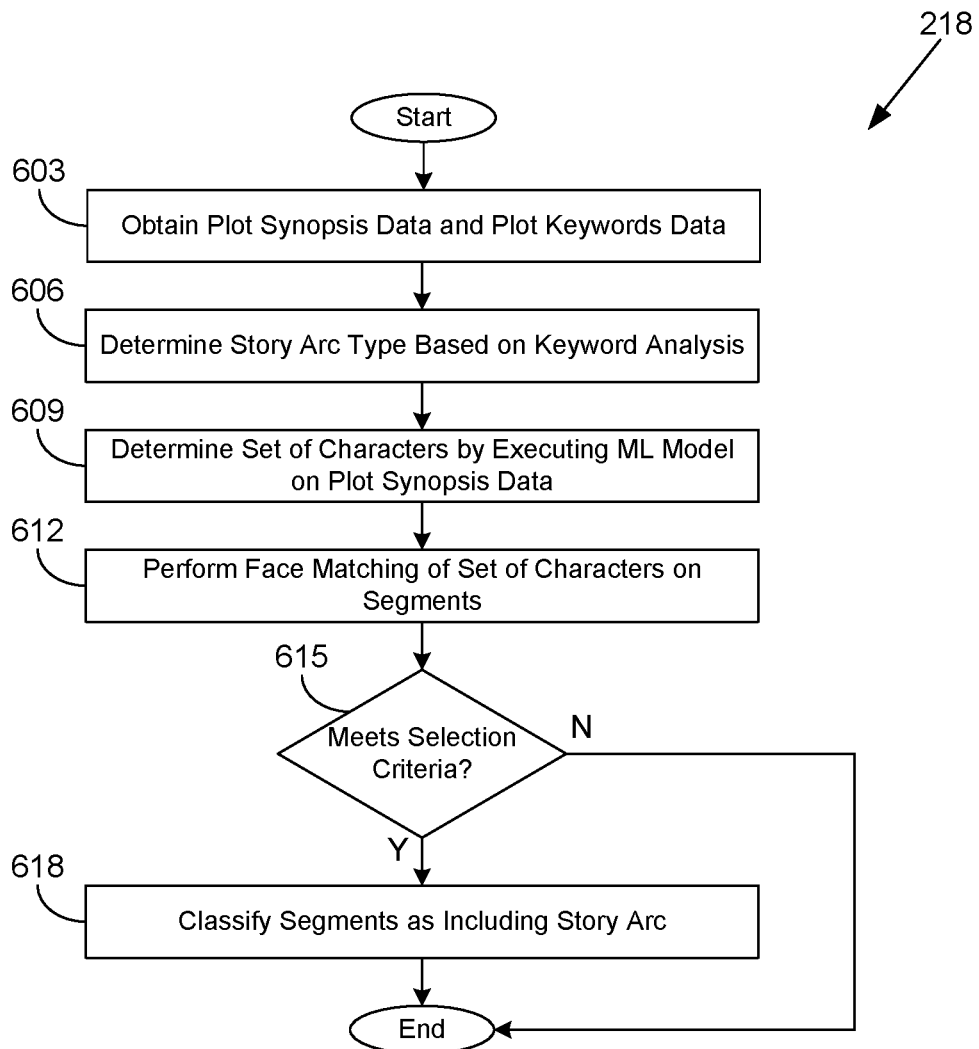

Referring next to FIG. 6, shown is a flowchart that provides one example of the operation of another portion of the segment generation service 218 according to various embodiments. Specifically, FIG. 6 relates to identifying segments relating to story arcs, such as love stories. It is understood that the flowchart of FIG. 6 provides merely an example of the many different types of functional arrangements that may be employed to implement the operation of the portion of the segment generation service 218 as described herein. As an alternative, the flowchart of FIG. 6 may be viewed as depicting an example of elements of a method implemented in the computing environment 203 (FIG. 2) according to one or more embodiments.

Beginning with box 603, the segment generation service 218 obtains plot synopsis data 251 (FIG. 2) and plot keywords data 252 (FIG. 2) corresponding to a video content item 224 (FIG. 2). In box 606, the segment generation service 218 determines a story arc type based at least in part on a keyword analysis. For example, the segment generation service 218 may determine whether the video content item 224 contains a love story if the keywords "love," "romance," or "romantic" are present in the plot keywords data 252. Such keywords may be manually curated.

In box 609, the segment generation service 218 determines a set of characters based at least in part on executing a machine learning model 230 (FIG. 2) on the plot synopsis data 251. In one scenario, the machine learning model 230 may be trained to answer the question, who is in love with whom, or more generally, who are the participants in a given story arc type. The output may be an identification of a single character, a pair of characters, and/or a set of multiple characters. For example, a BERT model may be used.

In box 612, the segment generation service 218 performs face matching on the set of characters for individual segments. For example, the segment generation service 218 may utilize reference images of the characters obtained from the cast member data 248 (FIG. 2) by cross referencing the character name with the cast member name. The reference images may show the cast member as he or she appears in the video content item 224. In one implementation, the face matching is performed using a 128-dimensional DLIB face recognition with a corresponding Euclidean distance being lower than 0.6 to be a match.

In box 615, the segment generation service 218 determines whether respective segments meet selection criteria for the story arc. For example, if all members of the set of characters are present in an individual segment, that segment may meet the selection criteria. Alternatively, if the faces in the set of characters are more than a threshold such as 50 percent of the total number of faces in the segment, and the ratio of the number of faces of the higher count participant over the lower count participant is below a threshold such as 5.0, the segment may meet the criteria.

If the segments meet the selection criteria, the segment generation service 218 proceeds to box 618 and classifies the segments as including the target story arc. Thereafter, the operation of the portion of the segment generation service 218 ends.

Figure 7:
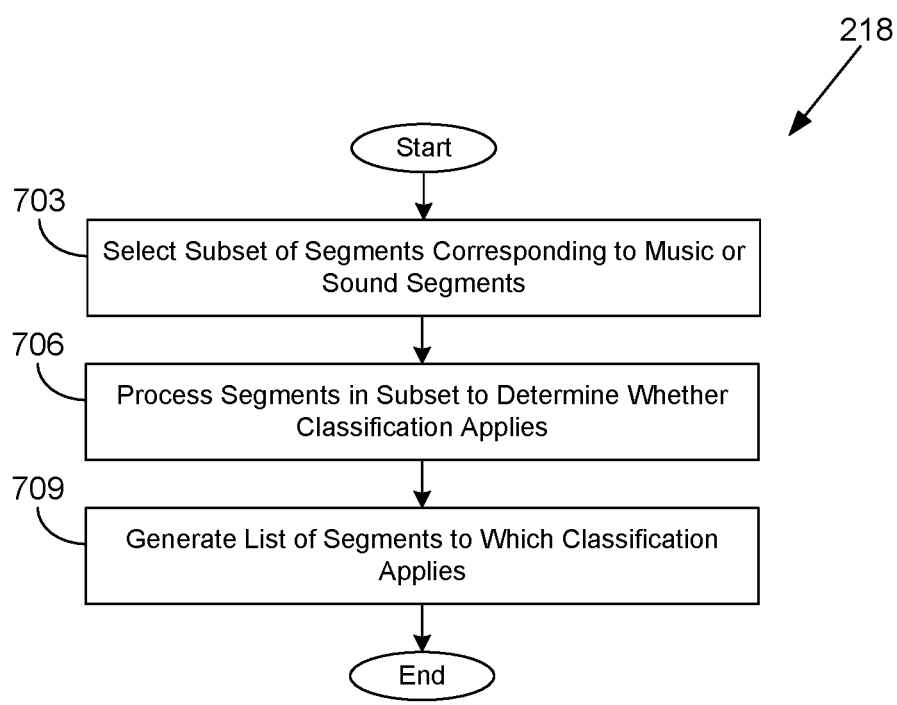

Turning now to FIG. 7, shown is a flowchart that provides one example of the operation of another portion of the segment generation service 218 according to various embodiments. It is understood that the flowchart of FIG. 7 provides merely an example of the many different types of functional arrangements that may be employed to implement the operation of the portion of the segment generation service 218 as described herein. As an alternative, the flowchart of FIG. 7 may be viewed as depicting an example of elements of a method implemented in the computing environment 203 (FIG. 2) according to one or more embodiments.

Beginning with box 703, the segment generation service 218 selects a subset of the segments identified in FIG. 3 that correspond to music or sound segments based at least in part on an audio characteristic. In selecting the subset, the segment generation service 218 can perform processing to identify which segments correspond to music or sound segments. In one implementation, the segment generation service 218 may begin with segments that are relatively loud as compared to a relative amplitude threshold. The segment generation service 218 may use a multi-class Support-Vector Machine to perform a classification of the segment as being speech, an instrumental, or a song.

In box 706, the segment generation service 218 processes the segments in the subset to determine whether one or more classifications apply to the segment. For example, the segment generation service 218 may obtain dialogue corresponding to the segment through the use of a speech-to-text service 221 (FIG. 2) and then compare the dialogue to known song lyrics in the soundtrack data 257 (FIG. 2). The segment generation service 218 may also perform face recognition as previously described in order to confirm that a character associated within a song is visually present in the segment video. In one implementation, the segment generation service 218 may classify a segment as being a song if the visually verified sound portions are above a threshold such as 25 percent of the total segment time.

In box 709, the segment generation service 218 generates a list of segments to which the classification applies. For example, the segment generation service 218 may generate a playlist so that a content access application 263 (FIG. 2) executed on a client device 206 (FIG. 2) may stream segments of interest 245 (FIG. 2) in chronological order in the video content item 224 (FIG. 2), while skipping segments that do not meet the classification. For example, a viewer may view a playlist of all songs within a video content item 224. Thereafter, the operation of the portion of the segment generation service 218 ends.

Figure 8:
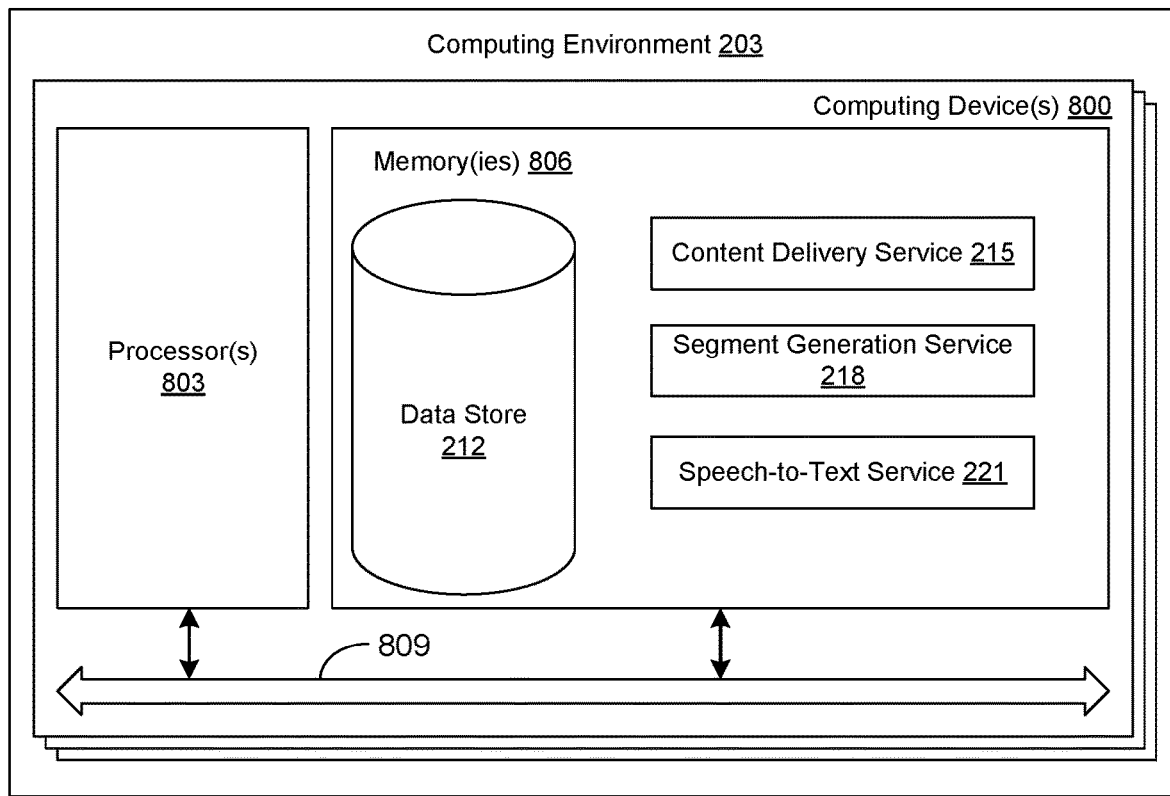
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are a content delivery service 215, a segment generation service 218, a speech-to-text service 221, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the content delivery service 215, the segment generation service 218, the speech-to-text service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-7 show the functionality and operation of an implementation of portions of the segment generation service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 3-7 show a specific order of execution, it is understood that the order of execution may differ from that which is depicted. For example, the order of execution of two or more blocks may be scrambled relative to the order shown. Also, two or more blocks shown in succession in FIGS. 3-7 may be executed concurrently or with partial concurrence. Further, in some embodiments, one or more of the blocks shown in FIGS. 3-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the segment generation service 218, or the speech-to-text service 221, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the segment generation service 218, or the speech-to-text service 221, may be implemented and structured in a variety of ways. For example, one or more applications described may be implemented as modules or components of a single application. Further, one or more applications described herein may be executed in shared or separate computing devices 800 or a combination thereof. For example, a plurality of the applications described herein may execute in the same computing device 800, or in multiple computing devices 800 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described at least by the following clauses:

Clause 1. A non-transitory computer-readable medium embodying a program executable in at least one computing device, wherein when executed the program causes the at least one computing device to at least: generate a plurality of segments of a video content item by splitting audio accompanying the video content item into a plurality of atomic audio segments of a fixed length, classifying the plurality of atomic audio segments based at least in part on relative audio amplitude, and smoothing adjacent classifications of the plurality of atomic audio segments using a time window; select a subset of the plurality of segments that correspond to conversation segments based at least in part on an audio segment amplitude being classified in a relatively silent classification and on a face detection detecting faces in at least a threshold number of corresponding video frames; determine whether respective segments in the subset of the plurality of segments depict a set of characters determined from plot synopsis metadata for the video content item; and generate a list of segments of the video content item that depict the set of characters.

Clause 2. The non-transitory computer-readable medium of clause 1, wherein when executed the program further causes the at least one computing device to at least determine the set of characters by applying a machine learning model to the plot synopsis metadata.

Clause 3. The non-transitory computer-readable medium of clauses 1 to 2, wherein when executed the program further causes the at least one computing device to at least determine that faces of the set of characters appear in the respective segments with at least a threshold frequency relative to other faces.

Clause 4. A method, comprising: generating, by at least one computing device, a plurality of segments of a video content item by analyzing audio accompanying the video content item; selecting, by the at least one computing device, a subset of the plurality of segments that correspond to conversation segments based at least in part on an audio characteristic of the subset of the plurality of segments and a face detection on the subset of the plurality of segments; processing, by the at least one computing device, individual segments of the subset of the plurality of segments to determine whether a classification applies to the individual segments; and generating, by the at least one computing device, a list of segments of the video content item to which the classification applies.

Clause 5. The method of clause 4, wherein processing the individual segments of the subset of the plurality of segments to determine whether the classification applies to the individual segments further comprises determining, by the at least one computing device, whether corresponding dialogue data for the individual segments matches at least one target quotation.

Clause 6. The method of clause 5, further comprising generating, by the at least one computing device, the corresponding dialogue data for the individual segments by performing a speech-to-text conversion on corresponding audio of the individual segments.

Clause 7. The method of clauses 5 to 6, wherein determining whether the corresponding dialogue data for the individual segments matches the at least one target quotation further comprises: performing, by the at least one computing device, a distance measure between the at least one target quotation and the corresponding dialogue data; and determining, by the at least one computing device, that a match occurs in response to determining that the distance measure is lower than a predefined distance threshold and that a face of a character associated with the at least one target quotation appears in at least one video frame of the individual segments.

Clause 8. The method of clauses 4 to 7, wherein processing the individual segments of the subset of the plurality of segments to determine whether the classification applies to the individual segments further comprises determining, by the at least one computing device, whether corresponding dialogue data is associated with the classification using a machine learning model trained on the classification.

Clause 9. The method of clauses 4 to 8, further comprising: identifying, by the at least one computing device, a set of characters from plot synopsis metadata associated with the video content item by applying a machine learning model to the plot synopsis metadata; and wherein processing the individual segments of the subset of the plurality of segments to determine whether the classification applies to the individual segments further comprises: performing, by the at least one computing device, face matching for the individual segments using reference images of the set of characters to determine whether the set of characters appear in the individual segments; and assigning, by the at least one computing device, the classification to the individual segments in response to determining that the set of characters appear in the individual segments.

Clause 10. The method of clauses 4 to 9, wherein processing the individual segments of the subset of the plurality of segments to determine whether the classification applies to the individual segments is performed in parallel for at least two of the individual segments.

Clause 11. The method of clauses 4 to 10, wherein selecting the subset of the plurality of segments that correspond to the conversation segments further comprises: identifying, by the at least one computing device, a particular segment from the plurality of segments that has an audio amplitude below a low amplitude threshold; performing, by the at least one computing device, the face detection on a plurality of video frames of the particular segment; and selecting, by the at least one computing device, the particular segment for the subset of the plurality of segments in response to determining that at least one face is shown in at least a threshold percentage of the plurality of video frames.

Clause 12. The method of clauses 4 to 11, wherein generating the plurality of segments of the video content item by analyzing the audio accompanying the video content item further comprises: dividing, by the at least one computing device, the audio accompanying the video content item into a plurality of atomic audio segments of a fixed length; classifying, by the at least one computing device, individual ones of the plurality of atomic audio segments as a silent segment or a sound segment; and generating, by the at least one computing device, the plurality of segments based at least in part on smoothing adjacent classifications of the plurality of atomic audio segments using a time window.

Clause 13. The method of clause 12, wherein classifying the individual ones of the plurality of atomic audio segments is performed using a support vector machine.

Clause 14. The method of clauses 12 to 13, wherein classifying the individual ones of the plurality of atomic audio segments as the silent segment or the sound segment further comprises: classifying, by the at least one computing device, a first atomic audio segment as the silent segment in response to determining that an audio amplitude of the first atomic audio segment is below a low amplitude threshold;

and classifying, by the at least one computing device, a second atomic audio segment as the sound segment in response to determining that an audio amplitude of the second atomic audio segment is above a high amplitude threshold.

Clause 15. The method of clause 14, further comprising dynamically determining the low amplitude threshold and the high amplitude threshold based at least in part on a relative amplitude distribution in the plurality of atomic audio segments.

Clause 16. A system, comprising: at least one computing device; and at least one application executable in the at least one computing device, wherein when executed the at least one application causes the at least one computing device to at least: generate a plurality of segments of a video content item by analyzing audio accompanying the video content item; select a subset of the plurality of segments that correspond to conversation segments based at least in part on a combination of an audio amplitude determination and a face detection on the subset of the plurality of segments; and process individual segments of the subset of the plurality of segments with a machine learning model to determine whether a classification applies to the individual segments.

Clause 17. The system of clause 16, wherein when executed the at least one application further causes the at least one computing device to at least: generate a speech-to-text transcription of the individual segments; and apply the speech-to-text transcription to the machine learning model.

Clause 18. The system of clauses 16 to 17, wherein when executed the at least one application further causes the at least one computing device to at least generate a playlist corresponding to the individual segments of the video content item to which the classification applies.

Clause 19. The system of clauses 16 to 18, wherein the machine learning model corresponds to a Bidirectional Encoder Representations from Transformers (BERT) model.

Clause 20. The system of clause 16, wherein processing the individual segments of the subset of the plurality of segments with the machine learning model to determine whether the classification applies to the individual segments further comprises processing the individual segments of the subset of the plurality of segments with a plurality of machine learning models to determine whether a respective classification associated with individual ones of the plurality of machine learning models applies.

Clause 21. A non-transitory computer-readable medium embodying a program executable in at least one computing device, wherein when executed the program causes the at least one computing device to at least: divide audio accompanying a video content item into a plurality of atomic audio segments of a fixed length; classify individual ones of the plurality of atomic audio segments as a silent segment or a sound segment; generate a plurality of segments of the video content item based at least in part on smoothing adjacent classifications of the plurality of atomic audio segments using a time window; select a subset of the plurality of segments that correspond to music segments based at least in part on an audio characteristic of the subset of the plurality of segments; process individual segments of the subset of the plurality of segments to determine whether a classification applies to the individual segments; and generate a list of segments of the video content item to which the classification applies.

Clause 22. The non-transitory computer-readable medium of clause 21, wherein processing the individual segments of the subset of the plurality of segments to determine whether the classification applies to the individual segments further comprises performing face matching on video frames corresponding to the individual segments to determine whether a cast member associated with a song appears in the video frames.

Clause 23. The non-transitory computer-readable medium of clauses 21 to 22, wherein processing the individual segments of the subset of the plurality of segments to determine whether the classification applies to the individual segments further comprises applying a machine learning model to speech corresponding to the individual segments.

Clause 24. A system, comprising: at least one computing device; and at least one application executable in the at least one computing device, wherein when executed the at least one application causes the at least one computing device to at least: divide audio accompanying a video content item into a plurality of atomic audio segments of a fixed length; classify individual ones of the plurality of atomic audio segments as a silent segment or a sound segment; generate a plurality of segments of the video content item based at least in part on smoothing adjacent classifications of the plurality of atomic audio segments using a time window; and select a subset of the plurality of segments that correspond to music segments based at least in part on an audio characteristic of the subset of the plurality of segments.

Clause 25. The system of clause 24, wherein the subset of the plurality of segments is selected based at least in part on a multi-class support-vector machine.

Clause 26. The system of clauses 24 to 25, wherein the individual ones of the plurality of atomic audio segments are classified as the silent segment in response to determining that the individual ones of the plurality of atomic audio segments have an audio amplitude less than a threshold percentage of the plurality of the atomic audio segments.

Clause 27. The system of clauses 24 to 26, wherein the individual ones of the plurality of atomic audio segments are classified as the sound segment in response to determining that the individual ones of the plurality of atomic audio segments have an audio amplitude greater than a threshold percentage of the plurality of the atomic audio segments.

Clause 28. The system of clauses 24 to 27, wherein when executed the at least one application further causes the at least one computing device to at least: process individual segments of the subset of the plurality of segments to determine whether a classification applies to the individual segments; and generate a list of segments of the video content item to which the classification applies.

Clause 29. The system of clause 28, wherein processing the individual segments of the subset of the plurality of segments to determine whether the classification applies to the individual segments further comprises applying a machine learning model to speech corresponding to the individual segments.

Clause 30. The system of clauses 28 to 29, wherein processing the individual segments of the subset of the plurality of segments to determine whether the classification applies to the individual segments further comprises performing face matching on video frames corresponding to the individual segments to determine whether a cast member associated with a song appears in the video frames.

Clause 31. The system of clauses 28 to 30, wherein processing the individual segments of the subset of the plurality of segments to determine whether the classification applies to the individual segments further comprises comparing speech detected from the individual segments to a song lyric.

Clause 32. The system of clause 31, wherein when executed the at least one application further causes the at least one computing device to at least perform a speech-to-text recognition process on audio from the individual segments.

Clause 33. A method, comprising: generating, by at least one computing device, a plurality of segments of a video content item by analyzing audio accompanying the video content item; selecting, by the at least one computing device, a subset of the plurality of segments that correspond to music segments based at least in part on an audio characteristic of the subset of the plurality of segments; processing, by the at least one computing device, individual segments of the subset of the plurality of segments to determine whether a classification applies to the individual segments; and generating, by the at least one computing device, a list of segments of the video content item to which the classification applies.

Clause 34. The method of clause 33, wherein processing the individual segments of the subset of the plurality of segments to determine whether the classification applies to the individual segments further comprises performing face matching on video frames corresponding to the individual segments to determine whether a cast member associated with a song appears in the video frames.

Clause 35. The method of clause 34, wherein performing the face matching on the video frames further comprises comparing, by the at least one computing device, a detected face in the video frames to a reference image of the cast member.

Clause 36. The method of clauses 33 to 35, wherein processing the individual segments of the subset of the plurality of segments to determine whether the classification applies to the individual segments is performed by a multi-class support-vector machine.

Clause 37. The method of clauses 33 to 36, wherein the classification corresponds to instrumental music.

Clause 38. The method of clauses 33 to 37, wherein the classification corresponds to a song.

Clause 39. The method of clauses 33 to 38, wherein the audio characteristic comprises an audio frequency content characteristic.

Clause 40. The method of clauses 33 to 39, wherein the audio characteristic comprises an audio amplitude characteristic.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
divide audio accompanying a video content item into a plurality of atomic audio segments of a fixed length;
classify individual ones of the plurality of atomic audio segments as a silent segment or a sound segment;
generate a plurality of segments of the video content item based at least in part on smoothing adjacent classifications of the plurality of atomic audio segments using a time window;
select a subset of the plurality of segments that correspond to music segments based at least in part on an audio characteristic of the subset of the plurality of segments;
process individual segments of the subset of the plurality of segments to determine whether a classification applies to the individual segments; and
generate a list of segments of the video content item to which the classification applies.

2. The non-transitory computer-readable medium of claim 1, wherein processing the individual segments of the subset of the plurality of segments to determine whether the classification applies to the individual segments further comprises performing face matching on video frames corresponding to the individual segments to determine whether a cast member associated with a song appears in the video frames.

3. The non-transitory computer-readable medium of claim 1, wherein processing the individual segments of the subset of the plurality of segments to determine whether the classification applies to the individual segments further comprises applying a machine learning model to speech corresponding to the individual segments.

4. A system, comprising:
at least one computing device; and
at least one application executable in the at least one computing device, wherein when executed the at least one application causes the at least one computing device to at least:
divide audio accompanying a video content item into a plurality of atomic audio segments of a fixed length;
classify individual ones of the plurality of atomic audio segments as a silent segment or a sound segment;
generate a plurality of segments of the video content item based at least in part on smoothing adjacent classifications of the plurality of atomic audio segments using a time window; and
select a subset of the plurality of segments that correspond to music segments based at least in part on an audio characteristic of the subset of the plurality of segments.

5. The system of claim 4, wherein the subset of the plurality of segments is selected based at least in part on a multi-class support-vector machine.

6. The system of claim 4, wherein the individual ones of the plurality of atomic audio segments are classified as the silent segment in response to determining that the individual ones of the plurality of atomic audio segments have an audio amplitude less than a threshold percentage of the plurality of the atomic audio segments.

7. The system of claim 4, wherein the individual ones of the plurality of atomic audio segments are classified as the sound segment in response to determining that the individual ones of the plurality of atomic audio segments have an audio amplitude greater than a threshold percentage of the plurality of the atomic audio segments.

8. The system of claim 4, wherein when executed the at least one application further causes the at least one computing device to at least:
process individual segments of the subset of the plurality of segments to determine whether a classification applies to the individual segments; and
generate a list of segments of the video content item to which the classification applies.

9. The system of claim 8, wherein processing the individual segments of the subset of the plurality of segments to determine whether the classification applies to the individual segments further comprises applying a machine learning model to speech corresponding to the individual segments.

10. The system of claim 8, wherein processing the individual segments of the subset of the plurality of segments to determine whether the classification applies to the individual segments further comprises performing face matching on video frames corresponding to the individual segments to determine whether a cast member associated with a song appears in the video frames.

11. The system of claim 8, wherein processing the individual segments of the subset of the plurality of segments to determine whether the classification applies to the individual segments further comprises comparing speech detected from the individual segments to a song lyric.

12. The system of claim 11, wherein when executed the at least one application further causes the at least one computing device to at least perform a speech-to-text recognition process on audio from the individual segments.

13. A method, comprising:
generating, by at least one computing device, a plurality of segments of a video content item by analyzing audio accompanying the video content item;
selecting, by the at least one computing device, a subset of the plurality of segments that correspond to music segments based at least in part on an audio characteristic of the subset of the plurality of segments;
performing face matching on video frames corresponding to individual segments of the subset of the plurality of segments to visually verify whether a cast member associated with a song appears in the video frames; and
generating, by the at least one computing device, a list of segments of the video content item that correspond to the music segments and are confirmed to have at least a threshold number of visually verified portions using the face matching.

14. The method of claim 13, wherein performing the face matching on the video frames further comprises comparing, by the at least one computing device, a detected face in the video frames to a reference image of the cast member.

15. The method of claim 13, further comprising processing the individual segments of the subset of the plurality of segments to determine whether a classification applies to the individual segments using a multi-class support-vector machine.

16. The method of claim 15, wherein the classification corresponds to instrumental music.

17. The method of claim 15, wherein the classification corresponds to the song.

18. The method of claim 13, wherein the audio characteristic comprises an audio frequency content characteristic.

19. The method of claim 13, wherein the audio characteristic comprises an audio amplitude characteristic.

20. The method of claim 13, wherein performing face matching further comprises using mean-shift clustering to obtain face feature center points in the video frames.

* * * * *